(12) United States Patent
Acampora et al.

(10) Patent No.: US 6,731,825 B1
(45) Date of Patent: May 4, 2004

(54) APPARATUS AND METHOD FOR PRODUCING IMAGES USING DIGITALLY STORED DYNAMIC BACKGROUND SETS

(75) Inventors: Alfonse Anthony Acampora, Staten Island, NY (US); Nicola John Fedele, Kingston, NJ (US); David Paul Bortfeld, Monmouth Junction, NJ (US); Paul Hashfield, Princeton Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 565 days.

(21) Appl. No.: 09/613,926

(22) Filed: Jul. 11, 2000

(51) Int. Cl.[7] .................................................. G06K 9/36
(52) U.S. Cl. ........................ 382/284; 348/586; 345/630
(58) Field of Search .................................. 382/284, 294, 382/300; 358/464, 450; 348/584, 586, 598; 345/589, 592, 630, 632–641

(56) References Cited

U.S. PATENT DOCUMENTS

| | | | | |
|---|---|---|---|---|
| 4,041,527 A | * | 8/1977 | Rayner et al. ................. 358/22 |
| 5,262,856 A | * | 11/1993 | Lippman et al. ............. 358/136 |
| 5,325,449 A | | 6/1994 | Burt et al. ..................... 382/56 |
| 5,566,251 A | * | 10/1996 | Hanna et al. ................ 382/284 |
| 5,649,032 A | | 7/1997 | Burt et al. ................... 382/284 |
| 5,742,354 A | * | 4/1998 | Vlahos et al. .............. 348/596 |
| 5,870,103 A | * | 2/1999 | Luo ........................... 345/435 |
| 6,348,953 B1 | * | 2/2002 | Rybczynski ................. 348/584 |
| 6,483,521 B1 | * | 11/2002 | Takahashi et al. .......... 345/630 |
| 6,525,741 B1 | * | 2/2003 | Klassen et al. ............. 345/589 |

* cited by examiner

Primary Examiner—Yon J. Couso
(74) Attorney, Agent, or Firm—William J. Burke

(57) ABSTRACT

A method and apparatus for providing a composite of stored dynamic background activities with newly filmed or captured live foreground activities, thereby providing a real-time and on-site guide to actors and directors.

20 Claims, 3 Drawing Sheets

TIME SYNC AND LOCKING FOR POST PRODUCTION

APPARATUS AND METHOD FOR PRODUCING IMAGES USING DIGITALLY STORED DYNAMIC BACKGROUND SETS

The present invention relates to an apparatus and concomitant method for image production, e.g., a movie film or motion video. More particularly, this invention relates to a method and apparatus that produces images from digitally stored dynamic background sets.

BACKGROUND OF THE DISCLOSURE

Creating a story line in an image based system (e.g., movie film, video tape, and the like) is usually a very expensive undertaking involving moving large numbers of cast and crew to a set location, and/or building a very expensive studio set. Namely, the story line can be broadly defined as having "foreground activities" and "background activities". The foreground activities may comprise interaction between characters, e.g., chatting, walking, running, and the like, whereas the background activities may comprise activities found behind the characters, e.g., activities of a busy city street with moving vehicles, activities of background people in a market place or restaurant, landscape view with moving tree branches, clouds, water and the like. While the foreground activities will change from one image production to another, the background set or activities may be used repeatedly for different image productions, e.g., the skylines and famous landmarks of well-known cities such as New York City, Paris, and London are subjects of numerous image productions. To physically transport an entire cast and supporting personnel and equipment to such an "on location" site is extremely costly and time consuming.

Although compositing live foreground activities with a static stored background is currently available, e.g., compositing a weather forecaster standing before a blue background with a stored image of a map, unfortunately, such compositing technique is only appropriate for a static background such as a weather map, where the locations of the relevant objects are fixed and well known by the weather forecaster.

If a "dynamic background", i.e., a background scene with motion and activities, is required, then the foreground activities must be filmed or captured before a blue background, where the composite image production is then assembled at a later time. Unfortunately, due to the complex background motion and/or activities, e.g., a windy scene along a riverbank, the filming of the foreground activities must be carefully choreographed and meticulously executed to maintain realism in the final image production. Thus, actors and actresses must perform complex actions before a blank blue background with only rough estimates of their spatial placement relative to the spatial placement of activities in the stored background. Additionally, important differences in conditions between the stored backgrounds and the on-site location such as lighting conditions and camera angles are also difficult parameters to account for at the time of the on-site location filming.

These criticalities present great challenges to actors, film crew and directors, since the success of the live filming may not be easily ascertained until the stored background activities are composited with the newly filmed foreground activities at a later time. Namely, powerful image processing systems are generally only available at an image production facility and is not readily available on-location. Since the overall composite image is not available at the time of filming of the foreground activities, substantial live refilming or modification at the production facility may then be required if error is found, thereby increasing the overall cost and time of image production. If guidance concerning the composite image can be immediately provided on location, the filming of the foreground activities can be simplified, e.g., refilming the scene at a slight different angle, changing the lighting on the set and the like.

Therefore, there is a need in the art for a method and apparatus that is capable of providing a composite of the stored dynamic background activities with the newly filmed or captured live foreground activities, thereby providing a real-time and on-site guide to actors and directors and greater artistic freedom.

SUMMARY OF THE INVENTION

In one embodiment of the present invention, a method and apparatus is disclosed that provides a composite of the stored dynamic background activities (i.e., a background image sequence) with the newly filmed or captured live foreground activities (i.e., a foreground image sequence), thereby providing a real-time and on-site guide to actors and directors. Specifically, ancillary data representative of the scene condition are captured for both the background image sequence and the foreground image sequence. The scene condition includes but is not limited to the camera parameters and the lighting condition at the time of capturing the image sequence. The ancillary information can be captured and disposed directly on the image sequence itself, thereby allowing an image processing system to quickly render the composite image sequence. To further alleviate the computational burden, the compositing operation is performed in low resolution in one embodiment.

Using the ancillary data, the present image production system is able to quickly and effectively provide a composite image sequence by compositing the background image sequence with the foreground image sequence in real time, e.g., at the time of filming the foreground image sequence. The composite image sequence can then be distributed to a viewfinder on a camera and to a monitor at the studio environment, thereby providing a very useful on-site guide to actors, film crew and directors.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
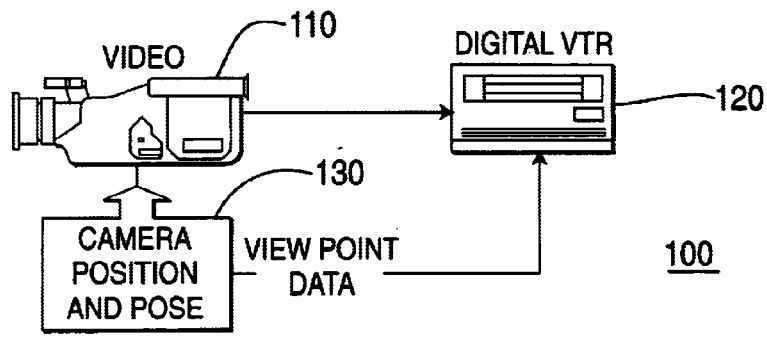
FIG. 1 depicts a block diagram of a background capture system.

FIG. 1 depicts a block diagram of a background capture system 100. System 100 comprises an image capture device 110, e.g., a high definition (HD) camera or video camera, for capturing image sequences or video images, a camera module 130 for generating ancillary information (i.e., metadata) about the scene conditions and/or camera parameters, and a recorder 120, e.g., a HD digital video tape recorder (VTR) for storing the captured image sequences and the associated metadata.

In operation, the background capture system 100 is a subset or a component of a much larger image production studio. The background capture system 100 can be initially deployed with a small film crew to capture background activities or scenes for an image production, e.g., capturing the seasonal changes of a remote location. The captured image sequences with the associated metadata are then stored in the digital VTR 120.

More importantly, the camera module 130 is employed with the camera 110 to generate ancillary information about the scene conditions and/or camera parameters as the image sequence is captured in the VTR. Specifically, the ancillary information or "metadata" is simultaneously generated and stored with the captured images. Namely, the HD camera captures a video image of the scene in the prescribed format and the data is recorded on an HD digital video tape recorder along with ancillary information about scene conditions and camera parameters. The data is subsequently transferred to an Image Data Base Management System (Image DBMS) and processed to provide the basis for both on-line (low resolution) and final (high resolution) generation of backgrounds, as described below. Thus, the association of the ancillary information with the captured image sequence will greatly aid in the image processing that will be conducted at the studio when the stored image sequences are retrieved. It should be noted that the camera module 130 can be incorporated with the camera 110 or implemented as a separate standalone module.

Figure 2:
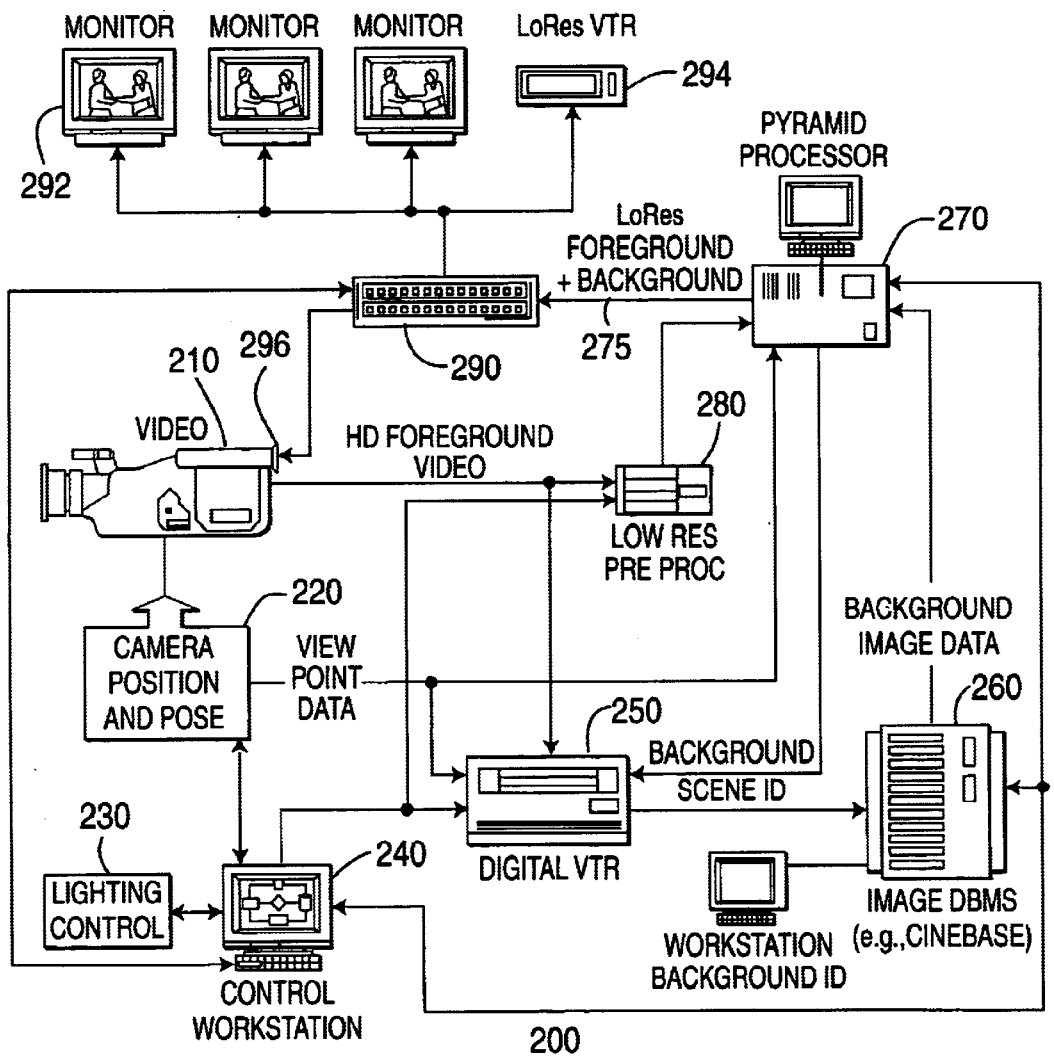
FIG. 2 depicts a block diagram of an image production system or studio.

FIG. 2 depicts a block diagram of an image production system or studio 200. The image production system or studio 200 comprises an image capture device 210, e.g., a HD camera, a camera position module 220 for generating ancillary information about the camera parameters, a lighting control module 230, a controller 240, e.g., a control workstation, a storage device 250, e.g., a digital VTR, a server 260 for storing a library of background image sequences or video images, a pyramid processor or pyramid generator 270, a low resolution preprocessor 280, a video distribution module 290, a monitor 292 and a low resolution digital VTR 294.

In operation, studio recording is extensively used in image production. Namely, the capture of composite scenes starts in a studio environment where real or live foreground activities are filmed with certain predetermined virtual background activities in mind. Actors and props fill the foreground, whereas stored background image sequences are retrieved from the database of an archived digital system to fill the background of the composite scenes.

To illustrate, camera 210 is employed in a studio environment to capture foreground activities, i.e., interactions between the characters of an image production. The captured foreground image sequences are forwarded to the digital VTR 250 for storage and to the low resolution preprocessor 280 to generate a low resolution image sequence of the foreground image sequence.

Additionally, the camera parameters (e.g., position or viewpoint information) associated with the capture of the current foreground image sequence is provided by the camera position module 220, where this ancillary information is also forwarded to the digital VTR 250 for storage. Similarly, the current lighting information associated with the capture of the current foreground image sequence is provided by the lighting control module 230, which also is forwarded to the digital VTR 250 for storage. It should be noted that both the camera position module 220 and the lighting control module 230 can be implemented with control capabilities as well, i.e., having circuitry to control the camera and lighting of the filming studio. For example, the camera position module 220 in communication with the controller 240 may issue commands to the camera to shift the camera angle horizontally by ten degrees, where this updated camera position information can be stored with the captured foreground images.

In one embodiment, a controller 240, e.g., a workstation, is deployed to coordinate the production of the composite scenes at the recording studio. The controller 240 is tasked with providing a composite scene derived from the live filming with a stored background scene in real time. The composite scene will serve as a guide to assist the filming crew, the director and the actors in adapting the current filming of the foreground activities. Namely, the composite scene is immediately made available at the studio environment at the time of filming.

To illustrate, the view point data and lighting data from the camera position module 220 and the lighting control module 230, respectively, are also forwarded to the controller 240 for processing. In one embodiment, these ancillary information are translated into metadata in accordance with a predefined format and are then stored with the captured current foreground image sequence. This ancillary data will be used to properly construct a composite scene as described below. Specifically, each image frame will have ancillary data that describes the scene condition such as view point of camera, lighting condition, time of day, season, date, frame numbers and the like. Specifically, camera parameters include but are limited to, camera position, camera viewpoint, lens settings such as aperture, focal length, lens filter used and the like. Additionally, the controller 240 can also forward control signals to the camera position module 220 and the lighting control module 230 to control the parameters of the camera and the lighting of the studio.

As the current foreground scene is captured, a stored background scene is retrieved simultaneously from the storage server 260 which holds a library of stored background image sequences that were previously captured by the background capture system 100 of FIG. 1. The selected background image sequences are intended to serve as the background for the current foreground scene being filmed. The selected background image sequences are retrieved from storage and forwarded to pyramid processor 270 for processing.

Pyramid processor 270 is designed to process each image frame into a pyramid of resolution levels, thereby providing a scalable set of different image resolutions that can be selected for a particular use. Since image processing is computational expensive, especially in real time application, an accurate and low resolution image sequence is desirable for the present implementation. Thus, the pyramid processor 270 is tasked with generating an accurate and low resolution version of a stored background scene that is received from the storage server 260.

Additionally, pyramid processor 270 is also tasked with performing a mosaic operation. Mosaic based image processing is broadly defined as a process that fuses two or more source images to form a composite image. The pyramid processor 270 is also capable of interpolating an image from one view point to another view point. Pyramid processors capable of providing such mosiacking functions have been developed by the Assignee of the present invention. For example, such pyramid processors are disclosed in U.S. Pat. No. 5,325,449 entitled "Method For Fusing Images And Apparatus Therefor", issued Jun. 28, 1994 and U.S. Pat. No. 5,649,032 entitled "System For Automatically Aligning Images To Form A Mosaic Image", issued Jul. 15, 1997 which are commonly owned by the Assignee are herein incorporated by reference.

Thus, the pyramid processor 270 is tasked with fusing the low resolution image of the background data with the low resolution image of the current foreground data from the low resolution preprocessor 280. In order for each pair of low resolution images to be properly fused, the ancillary data associated with both the foreground and background scenes provide important information that will allow the mosiac operation to be performed smoothly and accurately. Namely, the process necessitates that the two pieces of image sequence would have to be joined by evaluating video specific information, such as camera angle, for each video stream. The information that pertains to a specific image sequence is defined above as metadata. Thus, it is important to properly capture and associate the metadata when the foreground and background data are recorded for storage. The storage method should provide a mechanism to synchronize metadata information with a particular image sequence, so that it can be evaluated and processed by a system that will combine it to any other image streams stored in the archival storage area by evaluating its metadata information.

Returning to FIG. 2, a low resolution composite image sequence of both the foreground and background scenes are forwarded on path 275 to a video distribution module 290. The video distribution module 290 serves as a juncture where the low resolution composite image sequence can be forwarded to various input/output devices, e.g., one or more monitors 292, another VTR 294 to store the low resolution composite image sequence, or a viewfinder or a LED display 296 on the camera 210 itself. Thus, the composite image sequence is readily available to both the actors, the director and the film crew during the filming of the live foreground activities. Specifically, the actors and director can see the composite image sequences on the monitors, whereas the camera operator can see the composite image sequence while filming the shot through the viewfinder of the camera. The composite image sequence serves as an important guide in filming the foreground activities, thereby increasing the efficiency of filming the foreground activities and reducing the overall cost of image production.

In fact, since feedback is instantly available during filming, the director may decide that the selected background data is not appropriate or some parameters of the background data should be modified. For example, the director may elect to change the view point data of the background data, i.e., requesting the pyramid processor 270 to modify the camera parameters of the background data by performing a mosaic, a decimation, or other image processing operations. Concurrently, the view point of the camera 210 can also be changed to match the view point of the modified background data. The director can then reshoot the scene again and immediately see the results from the changed perspective. Thus, current feedback provides a valuable tool for a film studio environment.

Figure 4:
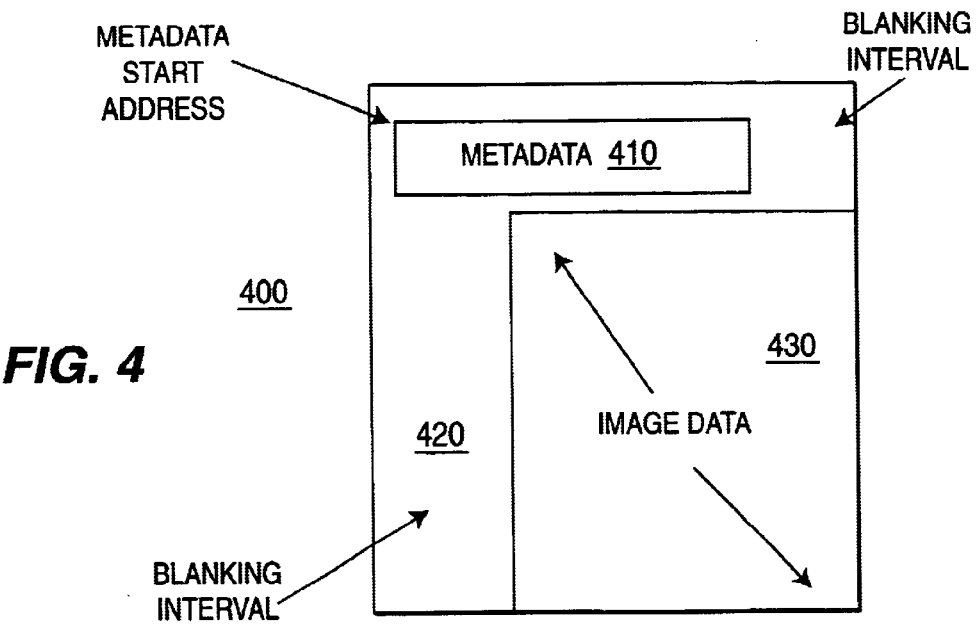
FIG. 4 depicts one embodiment of combining the metadata information with the video sequence.

As discussed above, the ancillary information plays an important role in assisting the image processing operation. FIG. 4 illustrates one embodiment of combining the metadata information with the video sequence. FIG. 4 illustrates a video field 400 operating at $\frac{1}{60}^{th}$ of a second containing both active pixel information 430 and blanking data 420. The ancillary information (metadata) 410 is stored in the vertical blanking interval of the current video field. If the ancillary information is the same for additional fields of video, then there will be no information in the specified blanking interval. In this manner, the metadata can be directly correlated with the image on the particular frame of information. The information can have a special start code so that it is not restricted to an exact location in the blanking interval.

More specifically, during the production of the movie as discussed below, it is imperative that these ancillary data be preserved and time related with respect to the foreground and background images. Specifically, it is essential that the foreground and background metadata and the computed rendering data are uniquely associated with the imagery on a field-by-field or frame-by-frame basis.

Figure 5:
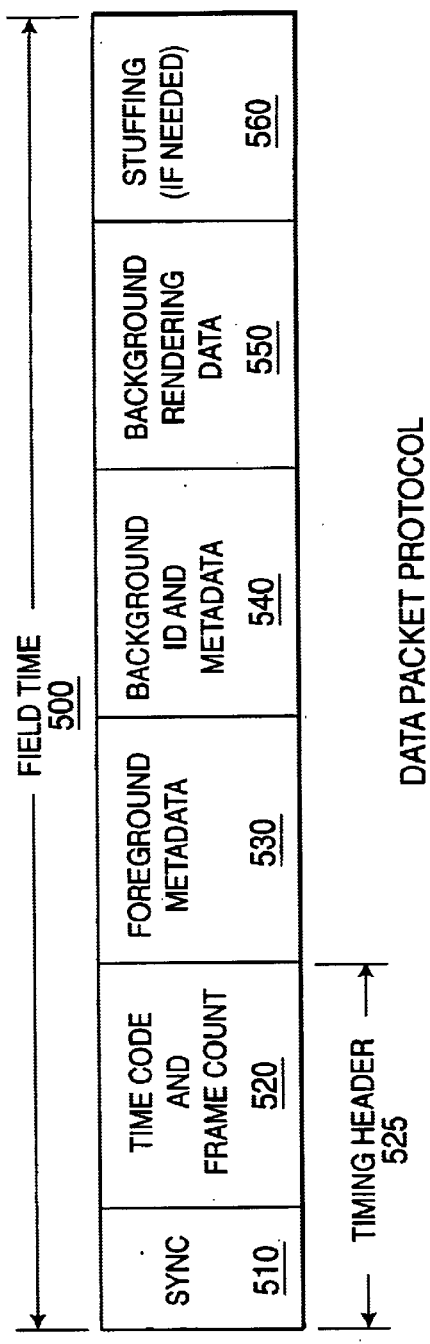
FIG. 5 illustrates a block diagram of a data packet protocol of the present invention.

FIG. 5 illustrates a block diagram of a data packet protocol 500 of the present invention. A time code and frame count generator, e.g., implemented within the controller 240 (or as separate modules), provides time code and frame count to the HD digital VTR 250 and the LoRes preprocessor 280. This generator can be configured with counters clocked by the pixel clock (for example). Alternatively, the timecode generator may be integrated into the VTR (usually the HD recorder). The time code is also used to synchronize the various metadata and rendering data. The time code forms the header for a packetized data protocol that allows the recording of all data with proper registration to the video in the playback (post production) phases of the film creation.

An example of a data packet formation of the present invention is shown in FIG. 5. A sync word 510 (similar to the MPEG2 Transport Packet sync) is used to identify the data packet. The sync, along with the time code and frame count 520 comprise the timing header 525. Foreground 530, background 540 and rendering data 550 fill in the data packet, along with stuffing data 560, if needed. Only the background ID need to be included since the background metadata will be recalled with the image data in the final processing.

The data rate is a sub-multiple of the pixel clock, for example, so that the data packet spans a field or frame time. This minimizes the data rate, and the expense of the data recorder. The data clocking can be increased so that the data packet spans the field or frame blanking time, or some other part of a field time.

Figure 3:
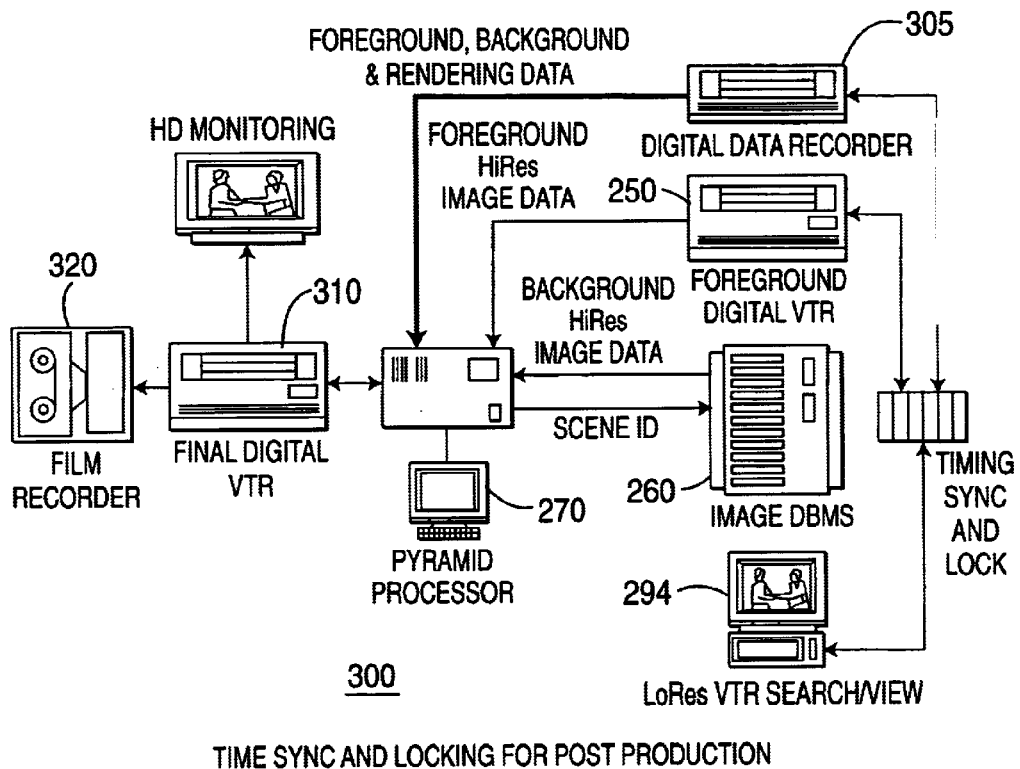
FIG. 3 depicts a block diagram of a post production system.

FIG. 3 depicts a block diagram of a post production system 300 of the present invention, wherein the data packet 500 was recorded in a data recorder 305 during production, as an alternative to incorporating the data packet within the video blanking, for example as disclosed above. Specifically, the synchronization system used in the final (post) processing is shown in FIG. 3. A Timing Sync and Lock system can pre-roll all recorders (HiRes foreground, LoRes composite and data recorders) to a specific timecode and frame count with comparators. The LoRes VTR 294 is used to search for, and preview, specific composite image sequences. The Digital Data Recorder 305 provides the rendering data which is used by the image processor to locate and render the background (via the scene ID) in high resolution, and combine it with the high definition foreground from the Foreground Digital VTR 250. Image processing can take place in non-real time (e.g., frame-byframe). The final image is stored on the Final Digital VTR 310 for subsequent transfer to the Film Recorder 320.

It should be noted that although the present invention is described above in terms of generating a low resolution composite image sequence at the film studio environment, the present invention is not so limited. Namely, as computational capability of image processing system increases per unit of cost in the future, the present invention can be adapted to provide a high resolution composite image sequence at the film studio environment instead. In such adaptation, components such as the low resolution preprocessor 280 and low resolution VTR 294 can be omitted.

Figure 6:
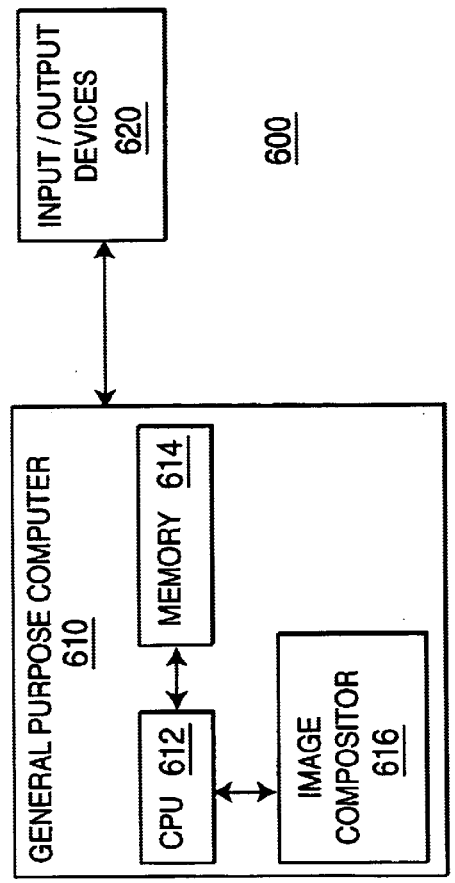
FIG. 6 illustrates a block diagram of an image production system of the present invention.

FIG. 6 illustrates a block diagram of an image production system 600 of the present invention. The image production system comprises a general purpose computer 610 and various input/output devices 620. The general purpose computer comprises a central processing unit (CPU) 612, a memory 614 and an image compositor 616 for compositing a background image sequence and a foreground image sequence into a composite image sequence.

In the preferred embodiment, the image compositor 616 may comprise the controller 240, the camera position module 220, the lighting control module 230, the pyramid processor 270, and the low resolution preprocessor 280 as discussed above. The image compositor 616 can be a physical device which is coupled to the CPU 612 through a communication channel. Alternatively, the image compositor 616 can be represented by a software application which is loaded from a storage device and resides in the memory 612 of the computer. As such, the image compositor 616 and associated data structure of the present invention can be stored on a computer readable medium. In other words, the present invention can be adapted where the various processing modules as disclosed about can be replaced by using a very powerful centralized processing system.

The computer 610 can be coupled to a plurality of input and output devices 620, such as a keyboard, a mouse, a camera (e.g., 210), a camcorder, a video monitor (e.g., 292), any number of imaging devices or storage devices (e.g., 250, 260, 294), including but not limited to, a tape drive, a floppy drive, a hard disk drive or a compact disk drive.

Although various embodiments which incorporate the teachings of the present invention have been shown and described in detail herein, those skilled in the art can readily devise many other varied embodiments that still incorporate these teachings.

What is claimed is:

1. Method for providing a composite image sequence, said method comprising the steps of:
   a) retrieving a background image sequence along with ancillary data representative of a scene condition when said background image sequence was captured, wherein said ancillary data for said background image sequence is generated when said background image sequence is captured;
   b) retrieving a foreground image sequence along with ancillary data representative of the a scene condition when said foreground image sequence was captured, wherein said ancillary data for said foreground image sequence is generated when said foreground image sequence is captured; and
   c) compositing said background image sequence with said foreground image sequence in accordance with said ancillary data of said background image sequence and said ancillary data of said foreground image sequence to form the composite image sequence.

2. The method of claim 1, wherein said compositing step c) composites said background image sequence with said foreground image sequence in low resolution.

3. The method of claim 1, further comprising the step of:
   b1) performing an image processing operation on said retrieved background image sequence to produce a modified background image sequence, wherein said compositing step c) composites said modified background image sequence with said foreground image sequence.

4. The method of claim 3, wherein said image processing operation is a mosaic operation that interpolates said retrieved background image sequence into said modified background image sequence having a different view point.

5. The method of claim 3, wherein said image processing operation decimates said retrieved background image sequence into said modified background image sequence having a lower resolution.

6. The method of claim 1, wherein said ancillary data comprises information associated with a camera parameter.

7. The method of claim 1, wherein said ancillary data comprises information associated with a lighting condition.

8. The method of claim 1, further comprising the step of:
   d) distributing said composite image sequence to a viewfinder of a camera.

9. The method of claim 1, further comprising the step of:
   d) distributing said composite image sequence to a monitor.

10. The method of claim 1, wherein said ancillary data is stored within a video field or frame of said background image sequence.

11. The method of claim 10, wherein said ancillary data is stored within a vertical blanking interval of said video field or frame.

12. The method of claim 1, wherein said ancillary data is stored within a video field or frame of said foreground image sequence.

13. The method of claim 12, wherein said ancillary data is stored within a vertical blanking interval of said video field or frame.

14. An apparatus for providing a composite image sequence, said apparatus comprising:
   a first storage for storing a background image sequence along with ancillary data representative of a scene condition when said background image sequence was captured, wherein said ancillary data for said background image sequence is generated when said background image sequence is captured;
   a second storage for storing a foreground image sequence along with ancillary data representative of then a scene condition when said foreground image sequence was captured, wherein said ancillary data for said foreground image sequence is generated when said foreground image sequence is captured; and
   a controller, coupled to said first and second storages, for compositing said background image sequence with said foreground image sequence in accordance with said ancillary data of said background image sequence and said ancillary data of said foreground image sequence to form the composite image sequence.

15. The apparatus of claim 14, wherein said controller composites said background image sequence with said foreground image sequence in low resolution.

16. The apparatus of claim 14, further comprising:
   a pyramid generator, coupled to said controller, for performing an image processing operation on said retrieved background image sequence to produce a modified background image sequence, wherein said controller composites said modified background image sequence with said foreground image sequence.

17. The apparatus of claim 16, wherein said pyramid generator interpolates said retrieved background image sequence into said modified background image sequence having a different view point.

18. The apparatus of claim 16, wherein said pyramid generator decimates said retrieved background image sequence into said modified background image sequence having a lower resolution.

19. The apparatus of claim 14, further comprising:
   a camera, coupled to said controller, wherein said composite image sequence is distributed to said viewfinder of said camera.

20. A computer-readable medium having stored thereon a plurality of instructions, the plurality of instructions including instructions which, when executed by a processor, cause the processor to perform the steps comprising of:

a) retrieving a background image sequence along with ancillary data representative of a scene condition when said background image sequence was captured, wherein said ancillary data for said background image sequence is generated when said background image sequence is captured;

b) retrieving a foreground image sequence along with ancillary data representative of a scene condition when said foreground image sequence was captured, wherein said ancillary data for said foreground image sequence is generated when said foreground image sequence is captured; and c) compositing said background image sequence with said foreground image sequence in accordance with said ancillary data of said background image sequence and said ancillary data of said foreground image sequence to form the composite image sequence.

* * * * *